US009248480B2

(12) United States Patent
Ohkami et al.

(10) Patent No.: US 9,248,480 B2

(45) Date of Patent: Feb. 2, 2016

(54) METHOD FOR CONTAMINATION PREVENTION IN FLUID STORAGE TANK REQUIRING TEMPERATURE CONTROL, AND DEVICE THEREFOR

(75) Inventors: Kohhei Ohkami, Toyama (JP); Shuji Ohkami, Toyama (JP); Hiroshi Hase, Toyama (JP)

(73) Assignee: Yatsuo Dairy Cooperative, Toyama (JP)

( * ) Notice: Subject to any disclaimer, the term of this patent is extended or adjusted under 35 U.S.C. 154(b) by 502 days.

(21) Appl. No.: 13/641,407

(22) PCT Filed: Apr. 11, 2011

(86) PCT No.: PCT/JP2011/059031

§ 371 (c)(1), (2), (4) Date: Dec. 20, 2012

(87) PCT Pub. No.: WO2011/129306

PCT Pub. Date: Oct. 20, 2011

(65) Prior Publication Data

US 2013/0192684 A1 Aug. 1, 2013

(30) Foreign Application Priority Data

Apr. 13, 2010 (JP) ................................ 2010-092479

(51) Int. Cl.

*F16K 49/00* (2006.01)
*B08B 17/00* (2006.01)

(Continued)

(52) U.S. Cl.

CPC .............. *B08B 17/00* (2013.01); *B65D 88/744* (2013.01); *B65D 90/50* (2013.01); *Y10T 137/0396* (2015.04); *Y10T 137/6416* (2015.04)

(58) Field of Classification Search

CPC .... B65D 88/744; B65D 88/748; B65D 90/50; F28D 1/06; B08B 17/00

USPC ........ 137/312, 334, 563; 165/104.13, 104.28, 165/104.31, 104.32, 132

See application file for complete search history.

(56) References Cited

U.S. PATENT DOCUMENTS 1,987,917 A * 1/1935 Thwaits .................. 165/104.31
2,434,956 A * 1/1948 Prentiss ........................ 62/48.3

(Continued)

FOREIGN PATENT DOCUMENTS

EP 0272494 12/1988
JP 9-166375 6/1997

(Continued)

OTHER PUBLICATIONS

Extended Search Report for European Patent Application No. 11768827.5 dated May 29, 2015.

*Primary Examiner* — John Fox
*Assistant Examiner* — Reinaldo Sanchez-Medina
(74) *Attorney, Agent, or Firm* — K&L Gates LLP

(57) ABSTRACT

A method and a plant for preventing contamination of a fluid in a fluid storage tank with a liquid cooling or heating medium is provided. In a method of controlling a temperature of a fluid in a fluid storage tank under a predetermined pressure by allowing a liquid cooling or heating medium to flow in an enclosed pressure-resistant jacket provided around the outer wall of the fluid storage tank, said method comprises allowing the cooling or heating medium to flow in the enclosed pressure-resistant jacket at a pressure not higher than the pressure x (atm) applied within the fluid storage tank, preferably lower than x (atm), whereby preventing contamination of said fluid with said cooling or heating medium. A plant for the method is also provided.

12 Claims, 10 Drawing Sheets

(51) Int. Cl.
*B65D 88/74* (2006.01)
*B65D 90/50* (2006.01)

(56) References Cited

U.S. PATENT DOCUMENTS

| | | | | | |
|---|---|---|---|---|---|
| 4,756,447 | A | * | 7/1988 | Gerhard | 220/565 |
| 4,882,912 | A | | 11/1989 | Fossey | |
| 5,170,659 | A | * | 12/1992 | Kemp | 73/46 |
| 5,743,023 | A | * | 4/1998 | Fay et al. | 34/287 |
| 6,610,250 | B1 | * | 8/2003 | Tuma | 422/38 |
| 2004/0112079 | A1 | * | 6/2004 | Omuta et al. | 62/435 |
| 2007/0104626 | A1 | * | 5/2007 | Yonekura et al. | 422/198 |

FOREIGN PATENT DOCUMENTS

| | | |
|---|---|---|
| JP | 2001-088894 | 4/2001 |
| JP | 2002-320419 | 11/2002 |
| JP | 2004316992 | 11/2004 |
| JP | 2009-293844 | 12/2009 |

* cited by examiner

METHOD FOR CONTAMINATION PREVENTION IN FLUID STORAGE TANK REQUIRING TEMPERATURE CONTROL, AND DEVICE THEREFOR

CROSS REFERENCES TO RELATED APPLICATIONS

The present application is a national stage of International Application No. PCT/JP2011/059031 filed on Apr. 11, 2011 and claims priority to Japanese Patent Application No. 2010-092479 filed on Apr. 13, 2010, the disclosure of which is incorporated herein by reference.

BACKGROUND

The present invention relates to a method for preventing, in a fluid storage tank which requires temperature control, a liquid cooling or heating medium that flows and circulates in an enclosed pressure-resistant jacket provided around an outer wall of said fluid storage tank from entering into said fluid storage tank during breakage failure of the wall of said storage tank, as well as a plant therefore.

A storage tank for storing a large amount of materials has come to be used in accordance with development of industrialization of manufacturing of various products. It is generalized to monitor (control) or maintain the temperature in the tank in compliance with the properties and use of the fluid stored in the tank. A conventional plant which monitors (controls) or maintains the temperature in a fluid storage tank 22 as shown in FIG. 9 can be generally accomplished by allowing a liquid cooling or heating medium to flow in an enclosed pressure-resistant jacket 24 provided around an outer wall of the fluid storage tank by means of a pressurization pump 27 and returning it to a cooling or heating medium-storage tank 23. The temperature of the cooling or heating medium in said cooling or heating medium-storage tank 23 is regulated by a temperature control unit 28.

However, according to a conventional method and plant in which a cooling or heating medium is forced to flow in an enclosed pressure-resistant jacket provided around an outer wall of a fluid storage tank by means of a pressurization pump to monitor (controls) or maintain the temperature of a fluid in the fluid storage tank, there were defects that the cooling or heating medium enters into the storage tank, thereby contaminating the fluid in the tank with the medium in an event that small breakage failures such as cracks, pinholes or the like generated at the wall of the tank. In addition, if the breakage failures such as cracks, pinholes or the like are very small, they cannot be visually confirmed and thus it was not possible to know contamination of the fluid in the tank. It was considered to be probable that products having a problem with regard to quality came into market.

SUMMARY

An object of the present invention is to provide a method and a plant for preventing contamination of a fluid in a fluid storage tank with a liquid cooling or heating medium, in view of the problems involved in the conventional fluid storage tanks.

Another object of the present invention is to provide a method and a device for detecting small breakage failures such as cracks, pinholes or the like in the wall of a fluid storage tank in a simple and easy way.

In order to achieve the above-mentioned object, there is provided according to the present invention a method for preventing contamination of a fluid in a fluid storage tank with a liquid cooling or heating medium owing to breakage of a wall of the fluid storage tank in which the temperature thereof is controlled by allowing the cooling or heating medium to flow in an enclosed pressure-resistant jacket provided around the outer wall of the fluid storage tank under a predetermined pressure (x) (supercharged pressure, reduced pressure or normal pressure, usually normal pressure of about 1 atm), which comprises allowing the cooling or heating medium to flow in the enclosed pressure-resistant jacket at a pressure not higher than the pressure x (atm) applied within the fluid storage tank, preferably at a pressure lower than the pressure x (atm).

Also provide is a plant for carrying out the above-mentioned method and for preventing contamination of a fluid in a fluid storage tank under a predetermined pressure with a liquid cooling or heating medium owing to breakage of a wall of the fluid storage tank in which the temperature of the fluid in said fluid storage tank is controlled by allowing the cooling or heating medium to flow through an enclosed pressure-resistant jacket provided around the outer wall of the fluid storage tank, which comprises allowing the cooling or heating medium to flow in the enclosed pressure-resistant jacket at a pressure lower than the predetermined pressure x (atm) within the fluid storage tank.

Also provide is a plant for carrying out the above-mentioned method, in which contamination of a fluid in a fluid storage tank which requires temperature control, with a liquid cooling or heating medium is prevented, which comprises:

(a) an enclosed pressure-resistant jacket for allowing a liquid cooling or heating medium to flow and circulate therein, said jacket being provided around the outer wall of the fluid storage tank;

(b) a cooling or heating medium-storage tank or a server tank which is provided separately from the fluid storage tank, said medium-storage tank or said server tank having a vent and being connected at it's one end to the enclosed pressure-resistant jacket, preferably to the bottom of the enclosed pressure-resistant jacket, via conduit line, wherein liquid level of the cooling or heating medium-storage tank or said server tank is set at a level lower than the bottom of the fluid storage tank by a height A (m) (A>0); and (c) a suction pump connected at it's one end to the exit of the cooling or heating medium in the enclosed pressure-resistant jacket and at the other end to the cooling or heating medium-storage tank or said server tank;

wherein, the height A (m) from the level of the liquid in the fluid storage tank or said server tank to the bottom of the enclosed pressure-resistant jacket is set to satisfy the following equation:

$$A \geq \{W(1-x+d)\}/\rho$$

wherein,

W is a water-section height (m) (about 10 m) under vacuum;

x (atm) is a pressure (atm) applied to the inside of the fluid storage tank, namely, the pressure (atm) applied to the liquid surface of the fluid, and is normal pressure, i.e. 1 atm when the fluid storage tank is open to the air;

d (atm) is a difference in pressure (atm) in which a pressure (atm) at the bottom of the enclosed pressure-resistant jacket is subtracted from the pressure x (atm) within the fluid storage tank, which difference is required at the bottom of the enclosed pressure-resistant jacket when the suction pump is stopped, wherein d>0;

ρ is a specific density of the cooling or heating medium, wherein the relation among the height A (m), a height B (m) of the enclosed pressure-resistant jacket from the bottom to the top thereof, and a suction height C (m) of the cooling or heating medium by means of the suction pump satisfies the following equation:

$$B \leq C - A$$

wherein, $$C = (C_{max} - S)/\rho;$$

$C_{max}$ (m) is a maximum suction height (m) of the cooling or heating medium by the suction pump, provided that the $C_{max}$ is a suction height when the cooling or heating medium is deemed as water;

S (m) is a safe operational value (m) and is larger than 0 (S>0); and

ρ and A are as defined above.

Also provide is a plant for carrying out the above-mentioned method, in which contamination of a fluid in a fluid storage tank which requires temperature control with a liquid cooling or heating medium is prevented, which comprises:

(a) an enclosed pressure-resistant jacket for allowing liquid cooling or heating medium to flow and circulate therein, said jacket being provided around the outer wall of the fluid storage tank;

(b) a cooling or heating medium-storage tank having a vent and connected at it's one end to the enclosed pressure-resistant jacket, preferably to the bottom of the enclosed pressure-resistant jacket, via conduit line;

(c) a suction pump connected at it's one end to the exit of the cooling or heating medium provided in the enclosed pressure-resistant jacket and connected at it's other end to the cooling or heating medium-storage tank via conduit line; and (d) a pressure-reduction unit connected at it's one end to the enclosed pressure-resistant jacket, preferably to the bottom of the enclosed pressure-resistant jacket, via conduit line and at it's other end to the cooling or heating medium-storage tank via conduit line, wherein a height B (m) from the bottom of the enclosed pressure-resistant jacket to the top thereof is set to satisfy the following equation:

$$B \leq C - \{W(1-E)\}/\rho;$$

wherein, normal pressure is deemed as 1 atm,

C (m) is a suction height (m) of the cooling or heating medium by the suction pump and $$C = (C_{max} - S)/\rho;$$

wherein, $C_{max}$ (m) is a maximum suction height (m) of water by the suction pump, provided that the $C_{max}$ is a suction height when the cooling or heating medium is water;

S (m) is a safe operational value (m) and is larger than 0 (S>0);

ρ is a specific density of the cooling or heating medium

W (m) is a water-section height (m) (about 10 m) under vacuum;

E (atm) is a pressure (atm) set at the pressure-reduction unit, wherein, $$E = x - d,$$

x (atm) is a pressure (atm) applied to the inside of the fluid storage tank;

d (atm) is a pressure difference (atm) in which a pressure (atm) at the bottom of the enclosed pressure-resistant jacket is subtracted from the pressure x (atm) within the fluid storage tank, which difference is required when the suction pump is stopped, wherein d>0.

Also provided is a plant for carrying out the above-mentioned method, in which the fluid storage tank is a larger size tank having the height H (m) (=B (m)) exceeding the height C (C (m) is a suction height (m) of the liquid cooling or heating medium by the suction pump) (namely, in the case where H>C), the enclosed pressure-resistant jacket is made to have a multistage construction with two or more staged enclosed pressure-resistant jackets, said first stage having the structure of the enclosed pressure-resistant jacket as described above, each of the second and subsequent stages being provided with (i) an enclosed pressure-resistant jacket and (ii) a server tank provided separately from the fluid storage tank or a pressure reduction unit and arranged between the cooling or heating medium-storage tank and each enclosed pressure-resistant jacket, preferably the bottom of the enclosed pressure-resistant jacket, Wherein, in the case where the server tank is provided, the height A' from the liquid level of the fluid in each of the server tank to the bottom of each enclosed pressure-resistant jacket is set to satisfy the following equation:

$$A' \geq \{W(1-x+d)\}/\rho$$

(wherein W, x, d and ρ are as defined above), and a height A'+B' (m) from the liquid level in each server tank to the top of each enclosed pressure-resistant jacket is set to satisfy the following equation:

$$A' + B' \leq C$$

(wherein $C = (C_{max} - S)/\rho$, and $C_{max}$, S and ρ are as defined above), and in the case where the pressure reduction unit is provided, the height B' from the bottom of each enclosed pressure-resistant jacket to the top thereof is set to satisfy the following equation:

$$B' \leq C - \{W(1-E)\}/\rho$$

(wherein C, W, E and ρ are as defined above).

The second and subsequent stages can be constructed similarly.

Further, there is also provided a pressure-reduction unit used in the plant of the present invention, which comprises a pressure-reduction valve for reducing the pressure of a pressurized cooling or heating medium and maintaining it at a constant pressure, and a pressure differential valve for further reducing the pressure of the cooling or heating medium.

There is also provided a method for detecting small breakages, such as cracks or pinholes, in a fluid storage tank in which the temperature of a fluid in said fluid storage tank is controlled by allowing a liquid cooling or heating medium to flow in an enclosed pressure-resistant jacket provided around the outside of a wall of the fluid storage tank, which comprises allowing the cooling or heating medium to flow in said enclosed pressure-resistant jacket at a pressure lower than a predetermined pressure x (atm) applied within the fluid storage tank, sampling the cooling or heating medium from an air pool provided in a passage of the cooling or heating medium, and analyzing the components of the cooling or heating medium, while at the same time preventing contamination of the fluid in the fluid storage tank with the liquid cooling or heating medium.

There is also provided a physically pressure-reducing apparatus for physically and forcibly reducing the pressure in a space in which a cooling or heating medium flows, while stopping the flow in the space and sealing the space, under such circumstance where a reduced pressure in the space becomes difficult to be maintained for some causes but a reduced pressure is required, said apparatus being used in a method and plant in which contamination of a fluid storage tank which requires temperature control with the liquid cooling or heating medium is prevented.

Effect of the Invention

According to the invention, even if small breakages such as cracks, pinholes or the like may suddenly generate in the wall of a fluid storage tank during maintaining the temperature of a fluid in the fluid storage tank by a cooling or heating medium, the cooling or heating medium is not entrained into the fluid in the storage tank since the pressure in the enclosed pressure-resistant jacket provided outside the storage tank is lower than that of the storage tank and thus the fluid in the storage tank flows into the enclosed pressure-resistant jacket. Thus, it is possible to prevent the fluid from contamination with bacteria or foreign matter via the cooling or heating medium, whereby the quality of the fluid in the storage tank can be maintained. In addition, small breakages such as cracks, pinholes or the like generated in the wall of the fluid storage tank can be readily detected by sampling the cooling or heating medium and detecting contamination of the sample of the cooling or heating medium.

Additional features and advantages are described herein, and will be apparent from the following Detailed Description and the figures.

DETAILED DESCRIPTION

Figure 1:
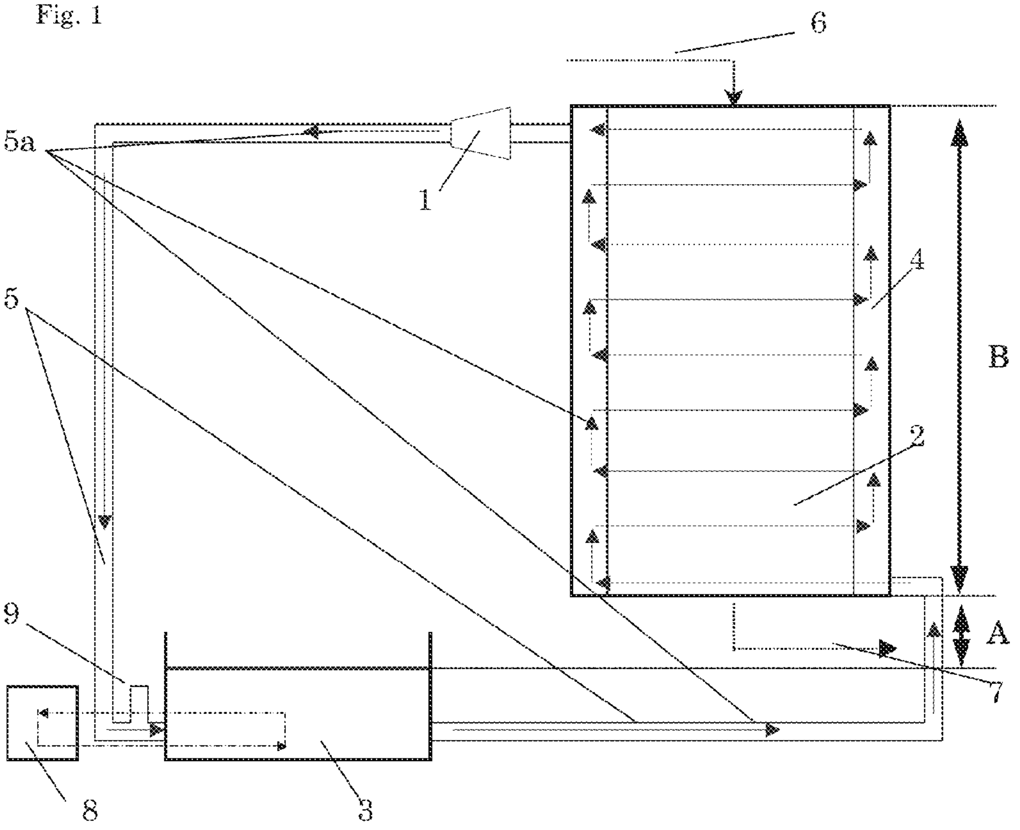
FIG. 1 shows a layout view of a one stage plant according to a first embodiment of the present invention.

It is necessary in the present invention to maintain a cooling or heating medium in a required pressure-reduced state and to regulate a relative height between the liquid level of a cooling or heating medium storage tank (or a cooling or heating medium server tank) and the top of the enclosed pressure-resistant jacket so that a pressure-reduced circulation of the medium becomes possible. Namely, it is important to set a suction height C (m) of the cooling or heating medium at a value derived by subtracting a safe operational value S (m) from a maximum suction height (m) of the cooling or heating medium $C_{max}$ (m) ($C=(C_{max}-S)$), and regulate a height A (m) from the liquid level of the fluid storage tank (or server tank) to the bottom of the enclosed pressure-resistant jacket provided around the wall of the fluid storage tank, and a height B (m) of the enclosed pressure-resistant jacket from the bottom to the top thereof.

The maximum suction height $C_{max}$ (m) of the cooling or heating medium by a suction pump depends on the efficacy of the pump. The maximum suction height $C_{max}$ (m) of the cooling or heating medium by a suction pump is defined as a maximum suction height (m) of water which is a typical cooling or heating medium. In order to maintain the cooling or heating medium in a pressure reduced state, the height A, B and C are determined so that the heights A and B and the suction height C of the cooling or heating medium by a suction pump satisfy the following formula (equation or inequality) (1):

$$A+B \leq C \quad (1)$$

wherein,

A: a height (m) from the liquid level of a fluid storage tank (or server tank) to the bottom of an enclosed pressure-resistant jacket, B: a height (m) of an enclosed pressure-resistant jacket from the bottom to the top thereof, C: a suction height of a cooling or heating medium by a suction pump. When the cooling or heating medium is water, the water suction height W (m) is about 10 m (W=about 10) under vacuum (0 atm) in a normal condition. Then, when the suction pump stops, the pressure at the bottom of the enclosed pressure-resistant jacket and the pressure at the top thereof can be shown by the following formulas (2) and (3):

$$\text{pressure (atm) at the bottom of the jacket}=(1-A/W)\times 1 \quad (2)$$

$$\text{pressure (atm) at the top of the jacket}=(1-(A+B)/W)\times 1 \quad (3)$$

More generally, if a specific density of the cooling or heating medium is expressed by ρ, the pressure at the bottom of the enclosed pressure-resistant jacket and the pressure at the top thereof when the suction pump stops can be shown by the following formulas (2') and (3'):

$$\text{pressure (atm) at the bottom of the jacket}=(1-A\rho/W)\times 1 \quad (2')$$

$$\text{pressure (atm) at the top of the jacket}=(1-(A+B)\rho/W)\times 1 \quad (3')$$

From the formulas (2') and (3'), it is shown that the pressure at the bottom of the enclosed pressure-resistant jacket is higher than that at the top of the jacket when the suction pump stops, whereby it is possible to allow the cooling or heating medium in the enclosed pressure-resistant jacket to flow at a pressure lower than the pressure x (atm) applied within the fluid storage tank (also when the pump stops) by setting the pressure at the bottom of the jacket during stopping (cessation) of the suction pump at a pressure not higher than the pressure x (atm) applied within the fluid storage tank, preferably lower than the pressure x. When the suction pump operates, the pressure at the bottom of the jacket is lower than that during cessation of the suction pump, and thus the pressure at the bottom of the jacket becomes lower than the pressure x (atm) applied within the fluid storage tank.

The suction height of a cooling or heating medium C (m) is established by the following formula (4):

$$C=(C_{max}-S)/\rho \quad (4)$$

wherein, $C_{max}$: a maximum suction height (m) of the cooling or heating medium by the suction pump;

S: a safe operational value (m)

ρ: a specific density of the cooling or heating medium ($g/cm^3$).

$C_{max}$ (m) is a maximum suction height (m) of the cooling or heating medium by the suction pump, S (m) is a safe operational value (m), and ρ is a specific density of the cooling or heating medium. The safe operational value S (m) is introduced taking account of drop of the suction efficacy of the suction pump or the like due to metal fatigue, and usually not less than 1 m, preferably 2 to 4 (m).

Then, the height A (m) from the liquid level of the cooling or heating medium storage tank (or cooling or heating medium server tank) to the bottom of the enclosed pressure-resistant jacket around the wall of the fluid storage tank is set up according to the following formula (5):

$$A\geq\{W(1-x+d)\}/\rho \quad (5)$$

wherein, x (atm) is a pressure (atm) applied to the inside of the fluid storage tank;

d (atm) is a difference in pressure (atm) between a pressure (atm) at the bottom of the enclosed pressure-resistant jacket and the pressure x (atm) within the fluid storage tank in which the former pressure is subtracted from the pressure x (atm), wherein d>0, preferably 0.05 to 0.4 (atm), particularly 0.2 to 0.4 (atm);

W is a water-section height (m) under vacuum (about 10 m).

Then B (m) is set up to satisfy the following formula (1):

$$B\leq C-A \quad (1)$$

Namely, $$B\leq(C_{max}-S)/\rho-W(1-x+d)/\rho \quad (6)$$

When S (m) and d (atm) are set at an appropriate value, the formula (6) can be changed to $$B=C-A=(C_{max}-S)/\rho-\{W(1-x+d)/\rho\} \quad (6')$$

Thus, it is possible to achieve a relatively reduced pressure in the enclosed pressure-resistant jacket even if the suction pump stops by the height A (m) from the liquid level in the cooling or heating medium storage tank to the bottom of the enclosed pressure-resistant jacket and the height B (m) of the enclosed pressure-resistant jacket from the bottom to the top thereof.

These heights A and B are adjusted to enable safe circulation considering the suction height of a cooling or heating medium by the suction pump C, the specific density of the cooling or heating medium, a required difference in pressure (atm) between a pressure (atm) at the bottom of the enclosed pressure-resistant jacket and the pressure x (atm) within the fluid storage tank, a safe operational value, and atmospheric pressure.

In the case where it is not possible to arrange the liquid level of a cooling or heating medium storage tank or server tank below the bottom of the enclosed pressure-resistant jacket (when A=0), a reduced-pressure circulation of the cooling or heating medium can be enable by using a pressure-reduction unit, and during cessation of a suction pump, it is possible to maintain the pressure in the enclosed pressure-resistant jacket not higher than that in a fluid storage tank (reduce pressure retention) by using a combination of an electromagnetic valve and a physically pressure-reducing apparatus.

Also in the case of carrying out pressure reduction by a pressure-reduction unit, the suction height of a cooling or heating medium C (m) is set up by the following formula (4):

$$C=(C_{max}-S)/\rho \quad (4)$$

(wherein, $C_{max}$, S, and ρ are as defined above). It is necessary to set up the safe operational value S (m) taking account of drop of the suction efficacy of the suction pump due to metal fatigue or the like.

B is set up according to the following formula (7):

$$B\leq C-W(1-E)/\rho \quad (7)$$

wherein, E (atm) is a pressure set up for the pressure reduction unit, and C, W and ρ are as defined above.

The pressure E (atm) set up for the pressure reduction unit is set up according to the following formula (8):

$$E=x-d \quad (8)$$

wherein, x and d are as defined above.

Embodiments according to the plant of the invention are explained by way of the drawings.

In the Case of Small-Sized Fluid Storage Tank

In the case of the first embodiment of the invention (see FIG. 1) wherein the height B (m) of an enclosed pressure-resistant jacket provided around a small-sized temperature-controlled fluid storage tank is not more than a maximum suction height $C_{max}$ (=pump efficacy) of a cooling or heating medium by a suction pump under normal condition of 1 atm, 25° C. (B is not more than 8 m when the specific gravity of the cooling or heating medium is 1 and the pump efficacy is 8 m, preferably not more than 6 m that is a value obtained by subtracting a safe operation value (preferably 2 m) from the pump efficacy $C_{max}$), a cooling or heating medium-storage tank 3 opened to air is arranged so that the liquid level of the tank 3 is located A (m) below the bottom of a fluid storage tank 2 opened to air (below by $A=\{W(1-x+d)\}/\rho=0.5$ to 2 m when the cooling or heating medium is water), and the inside of an enclosed pressure-resistant jacket 4 provided around the wall of the fluid storage tank 2 is aspirated by a suction pump 1 provided near the exit of the cooling or heating medium of said jacket to reduce the pressure thereof lower than the inside of the fluid storage tank 2 (pressure reduction by a height). Namely, by setting the height A+B (m), a height from the cooling or heating medium-storage tank 3 to the top of the enclosed pressure-resistant jacket, not more than the suction height C (m) of the cooling or heating medium by the suction pump 1, i.e. A+B≤C, or alternatively C=A+B when S and d are set at an appropriate value, the cooling or heating medium is sent from the cooling or heating medium-storage tank 3 to the bottom of the enclosed pressure-resistant jacket 4 via a cooling or heating medium-flow conduit line 5, aspirated to allow flowing in the enclosed pressure-resistant jacket 4, and returned to the cooling or heating medium-storage tank 3 via a cooling or heating medium-flow conduit line 5, whereby allowing the cooling or heating medium in the enclosed pressure-resistant jacket 4 to flow always under a pressure lower than that in the fluid storage tank 2 (a pressure which is relatively lower than that inside the fluid storage tank 2 which is usually not higher than 1 atm). Further, in the case where suction pump 1 stops, it is possible to maintain the inside of the enclosed pressure-resistant jacket 4 at a pressure-reduced state (a state in which the pressure is relatively lower than that inside the fluid storage tank 2, which is usually not higher than 1 atm), as shown by the above formulas (2) and (3) or (2') and (3'). An air pool 9 may be provided in the in a cooling or heating medium flow pipe 5 arranged between the suction pump 1 and the cooling or heating medium-storage tank 3, preferably near the cooling or heating medium-storage tank 3, and at a height not higher than the liquid level of the cooling or heating medium-storage tank 3. The temperature of the cooling or heating medium in the cooling or heating medium-storage tank 3 can be controlled by a temperature-control equipment 8.

In the case where the cooling or heating medium-storage tank 3 is distant from the fluid storage tank 2, or in the case where the cooling or heating medium-storage tank 3 is a larger size tank and it is not possible to instal the cooling or heating medium-storage tank at a level (height) below the fluid storage tank 2, a server tank 10 may be provided at a level below and near the fluid storage tank 2.

In that case, the cooling or heating medium supplied from the cooling or heating medium-storage tank 3 is pressurized by a pressurizing pump 17, and sent to the server tank 10. Thereafter, the cooling or heating medium from the server tank 10 is circulated under a reduce pressure in the enclosed pressure-resistant jacket 4, and returned to the cooling or heating medium-storage tank 3. Also in this case, A+B (wherein A is a height from the liquid level of the server tank 10 to the bottom of the enclosed pressure-resistant jacket 2, B is a height of the enclosed pressure-resistant jacket) is set up at a value not more than the suction height C (m) of the suction pump, i.e. $A+B \leq C$, or alternatively, at a value that satisfies $A+B=C$ when S and d are set at an appropriate value.

It is preferable to provide the server tank 10 with a vent (ventilation pipe), make the server tank 10 open to the air in place of enclosing it, and provide with a ball tap to regulate a flow volume of the cooling or heating medium from the cooling or heating medium-storage tank 3. By such constitution, a liquid level of the server tank 10 can be maintained at a constant level.

Figure 2:
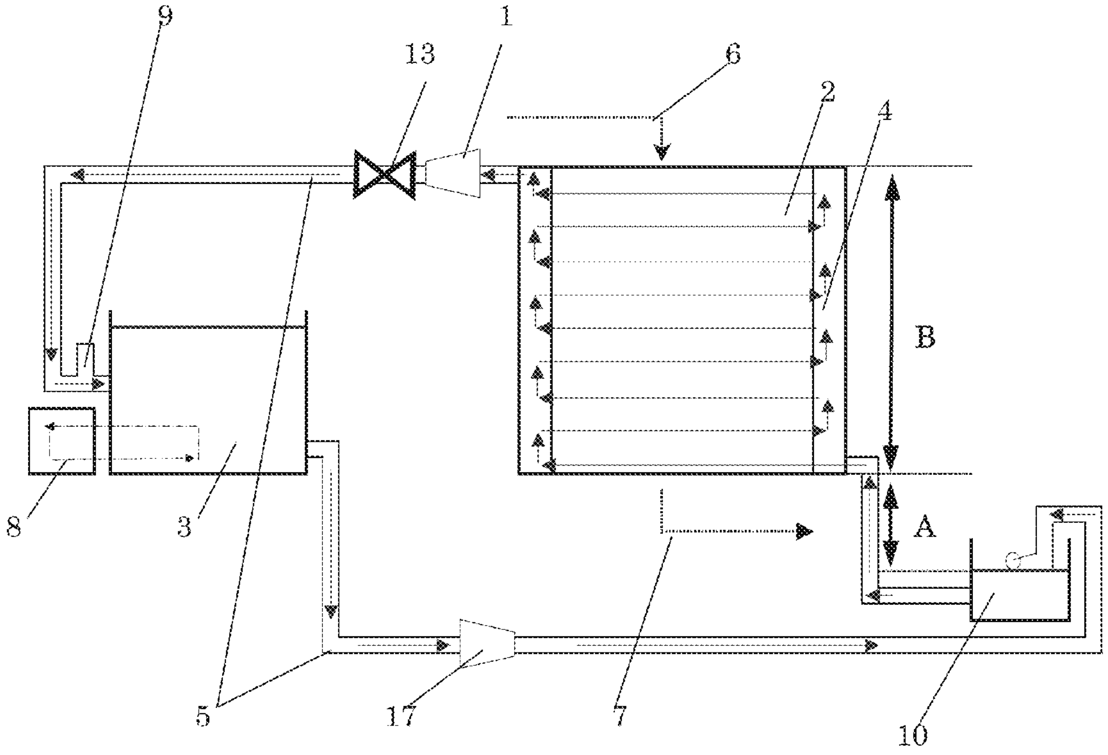
FIG. 2 shows a layout view of a one stage plant according to a second embodiment of the present invention.

In order to maintain a pressure-reduced state within the enclosed pressure-resistant jacket 4 even when the suction pump 1 stops, an electromagnetic valve 13 may be arranged downstream the suction pump 1, as shown in FIG. 2.

Figure 3:
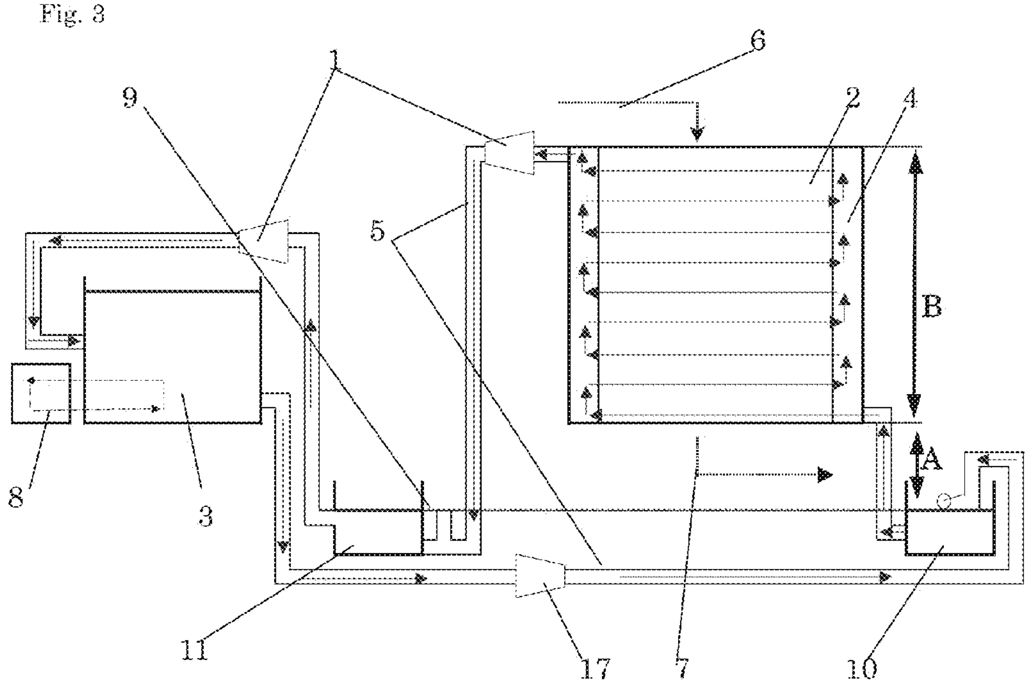
FIG. 3 shows a layout view of a one stage plant according to a third embodiment of the present invention.

As shown in FIG. 3, by providing a cooling or heating medium-receiver tank 11 between the suction pump 1 arranged near the exit of the cooling or heating medium of the enclosed pressure-resistant jacket 4 and the cooling or heating medium-storage tank 3, providing the cooling or heating medium-receiver tank 11 with a level sensor (not shown) which cooperates with the suction pump 1, it is also possible to regulate a liquid level of the cooling or heating medium-receiver tank 11.

In place of maintaining a pressure-reduced state by setting up the liquid level of the cooling or heating medium-storage tank 3 below the bottom of the fluid storage tank 2 by means of the server tank 10 (pressure reduction by height), it is also possible to adjust a pressure by a pressure-reduction unit 12 to achieve a pressure-reduced state in the enclosed pressure-resistant jacket 4 compared with a pressure of the inside of the storage tank 2 (pressure reduction by a pressure reduction unit).

In the embodiment of the invention shown in FIG. 4, a pressure-reduction unit 12 is provided in preparation for cessation of the pump to reduce a pressure in conduit lines in place of setting up the liquid level of the cooling or heating medium-storage tank 3 below the bottom of the fluid storage tank 2.

Also included in the present invention are various methods such as methods in which a physically pressure-reducing apparatus 14 is provided between the exit of the enclosed pressure-resistant jacket 4 and the suction pump 1 to forcibly reduce the pressure in the enclosed pressure-resistant jacket 4, instead of controlling a pressure-reduced state in the enclosed pressure-resistant jacket 4 by the height. An electromagnetic valve 13 may be laid on to seal the enclosed pressure-resistant jacket 4 in preparation for cessation of the suction pump 1.

In any of the embodiments, the inside of the cooling or heating medium-storage tank and the enclosed pressure-resistant jacket, preferably the lowest part (bottom) of the jacket, are connected by a conduit line optionally via a cooling or heating medium-receiver tank 11, and the exit, usually arranged at the top, of the enclosed pressure-resistant jacket and an admission port of the suction pump 1 are connected by a conduit line, and further a discharge port of the suction pump 1 and the inside of the cooling or heating medium-storage tank 3 are connected by a conduit line. In this case, it is preferable, in view of preventing contamination with air, to set the conduit line below the liquid level of the cooling or heating medium-storage tank 3.

It is necessary to provide the cooling or heating medium-storage tank with a ventilation hole (ventilation pipe). This is because it is necessary for the cooling or heating medium-storage tank 3 to be open to the air instead of making it closed. The reason therefor is that by returning a pressurized state of the returning (returning from suction pump 1 to cooling or heating medium-storage tank 3) cooling or heating medium in the conduit line to a normal pressure state, a conduit line for forwarding (forwarding from the cooling or heating medium-storage tank 3 to the enclosed pressure-resistant jacket 4) cooling or heating medium can be always maintained in a reduced state.

In order to maintain the cooling or heating medium in a pressure-reduced state, it is necessary that the enclosed pressure-resistant jacket 4 is filled with the cooling or heating medium even when the suction pump 1 stops. Namely, it is desirable that, when the suction pump 1 stops, merely flow of the cooling or heating medium stops but does not discharge to the cooling or heating medium-storage tank 3. This is because, in order to maintain a pressure-reduced state even when the suction pump 1 stops, the pressure-reduced state cannot be maintained if the cooling or heating medium discharges to the cooling or heating medium-storage tank 3.

Therefore, in a conduit line from the discharge port of the suction pump 1 to the inside of the cooling or heating medium-storage tank 3, the conduit line from the discharge port of the suction pump 1 may be inserted into the liquid of the cooling or heating medium-storage tank 3, or may be attached to the cooling or heating medium-storage tank 3 at a site of the wall thereof below the liquid level of the tank 3. Alternatively, when the conduit line from the discharge port of the suction pump 1 is not be below the liquid level of the cooling or heating medium-storage tank 3, an electromagnetic valve 13 which is closed in compliance with stopping of the suction pump 1 may be laid on between the enclosed pressure-resistant jacket 4 and the cooling or heating medium-storage tank 3.

By the method and plat for preventing contamination of a fluid in a fluid storage tank 2 with a cooling or heating medium by making an enclosed pressure-resistant jacket 4 provided around the outer wall of the fluid storage tank 2 in a pressure-reduced state are meant a method and plant in which the enclosed pressure-resistant jacket 4 is always maintained in a pressure-reduced state (a state which is relatively lower in pressure compared with a pressure within the fluid storage tank 2), and the method and plant are not necessarily restricted to the embodiments shown above.

In the Case of Large-Sized Fluid Storage Tank

In the case where the present invention is applied to a large-sized fluid storage tank which requires an enclosed pressure-resistant jacket having a height exceeding the height C (m) of the suction height (m) of a cooling or heating medium by the suction pump, the enclosed pressure-resistant jacket is constructed to a multiple staged (multistage) construction having a server tank and/or a pressure-reduction unit, if necessary, and a suction pump in each stage.

Figure 5:
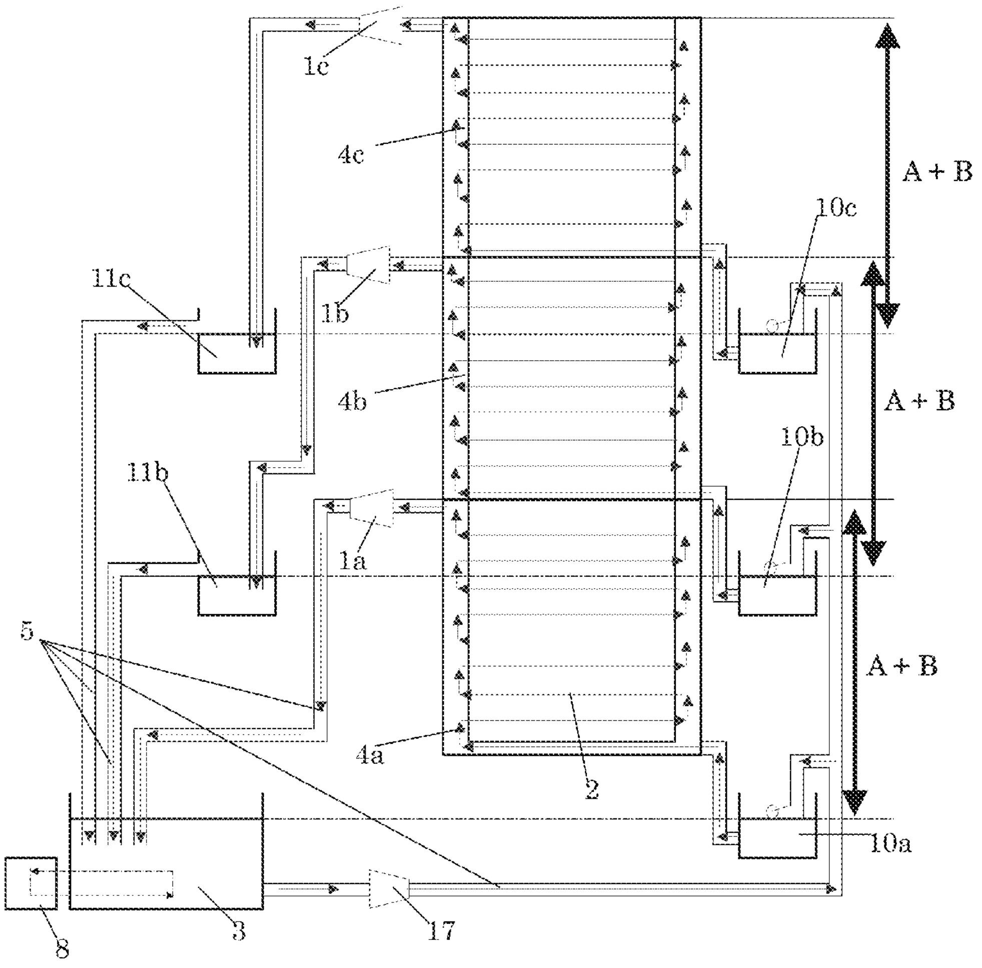
FIG. 5 shows a layout view of a plant having a large fluid storage tank according to a first multistage embodiment of the present invention.
Figure 6:
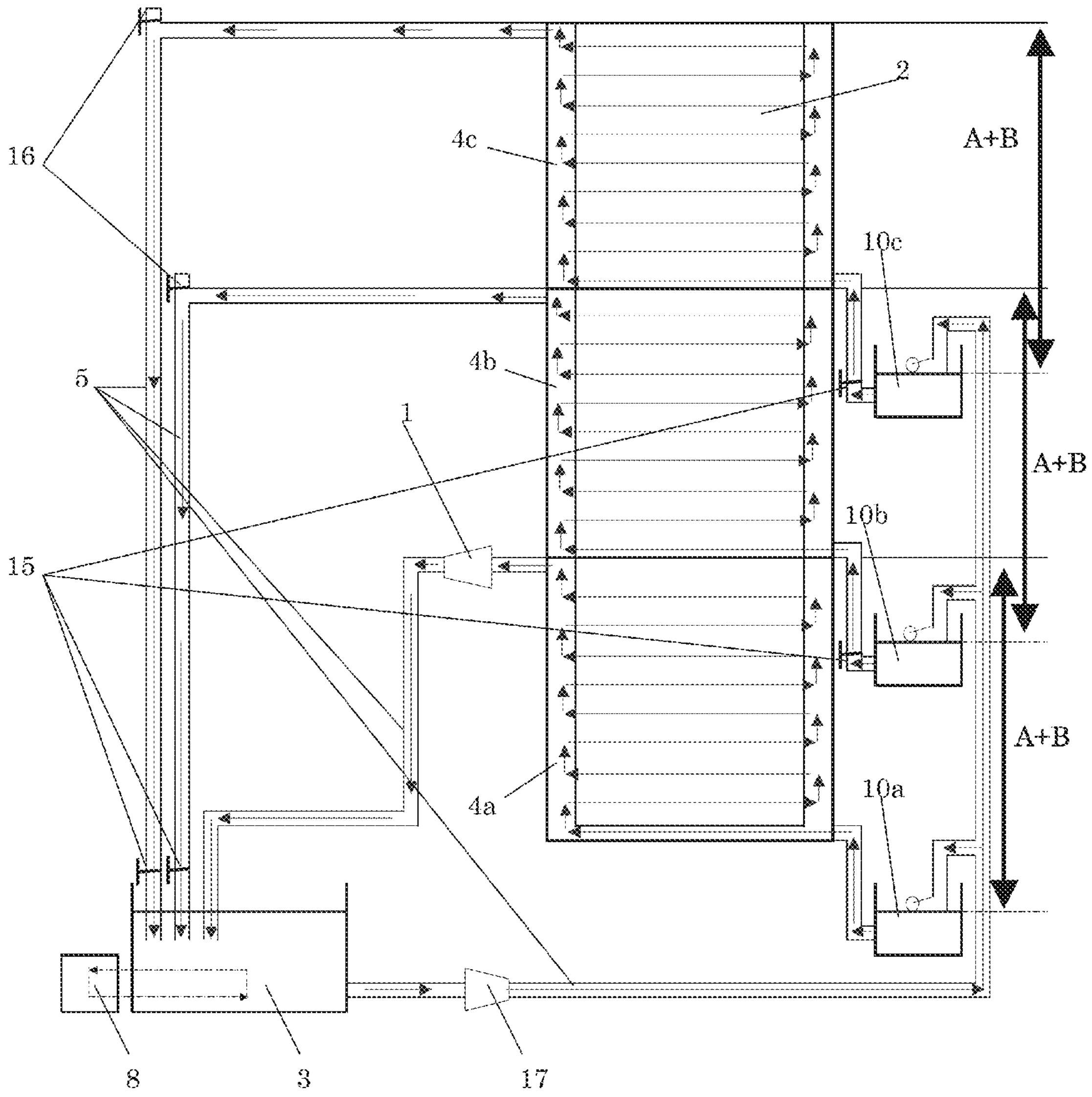
FIG. 6 shows a layout view of a plant having a large fluid storage tank according to a second multistage embodiment of the present invention.
Figure 7:
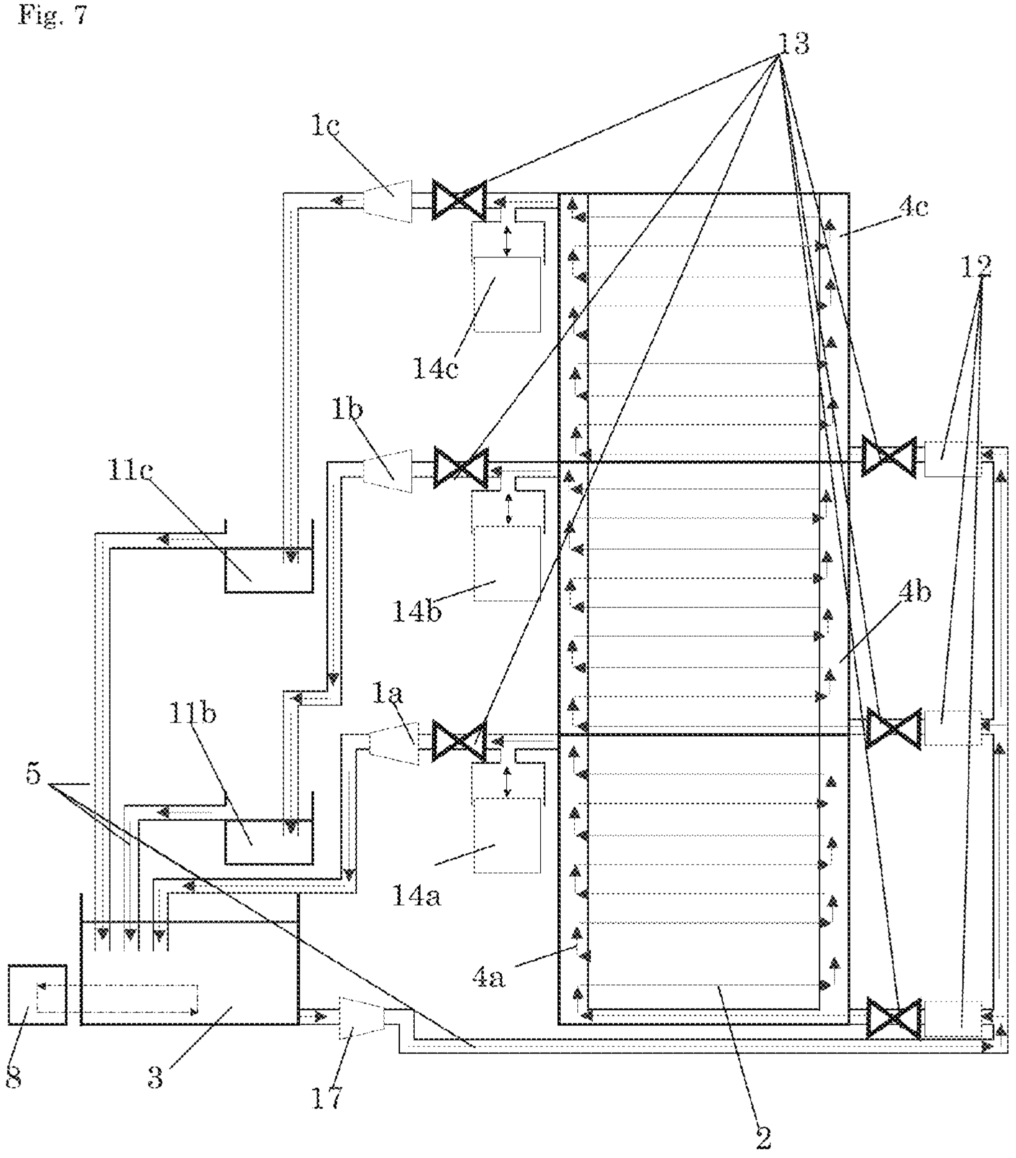
FIG. 7 shows a layout view of a plant having a large fluid storage tank according to a third multistage embodiment of the present invention.
Figure 8:
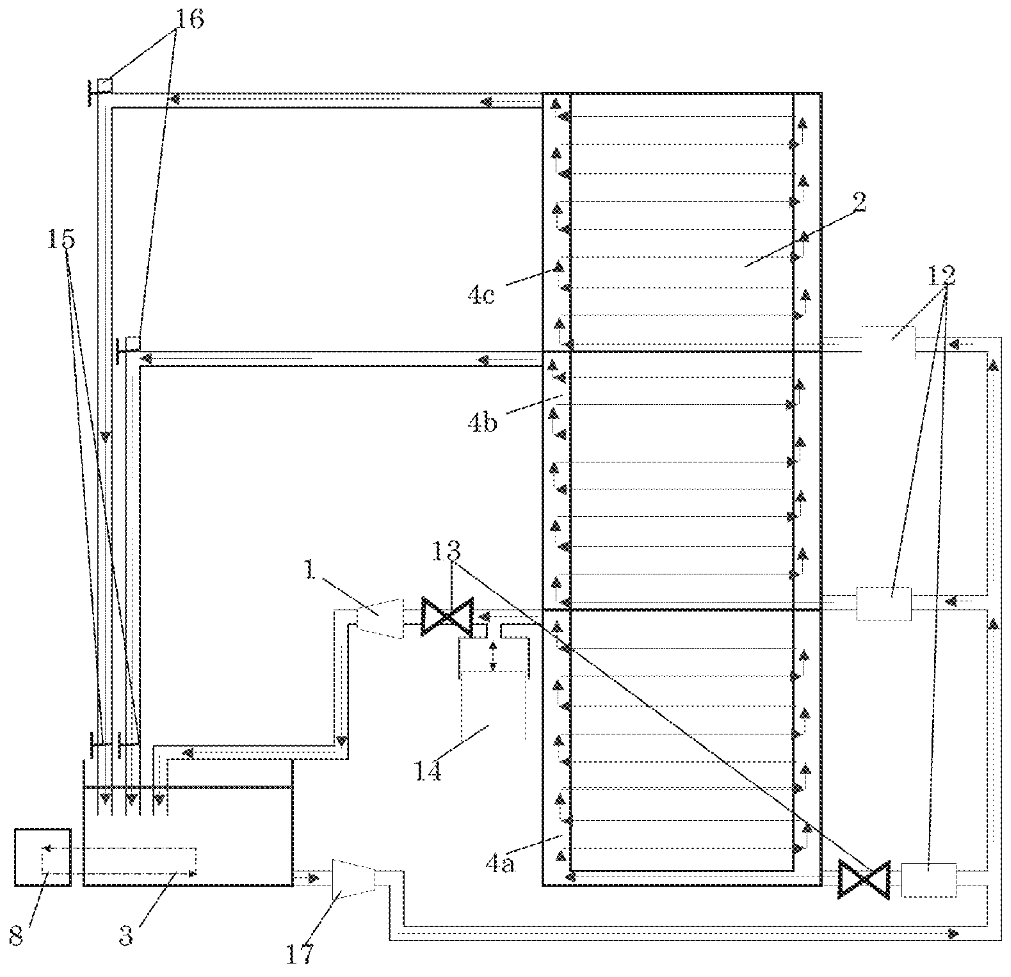
FIG. 8 shows a layout view of a plant having a large fluid storage tank according to a fourth multistage embodiment of the present invention.
Figure 9:
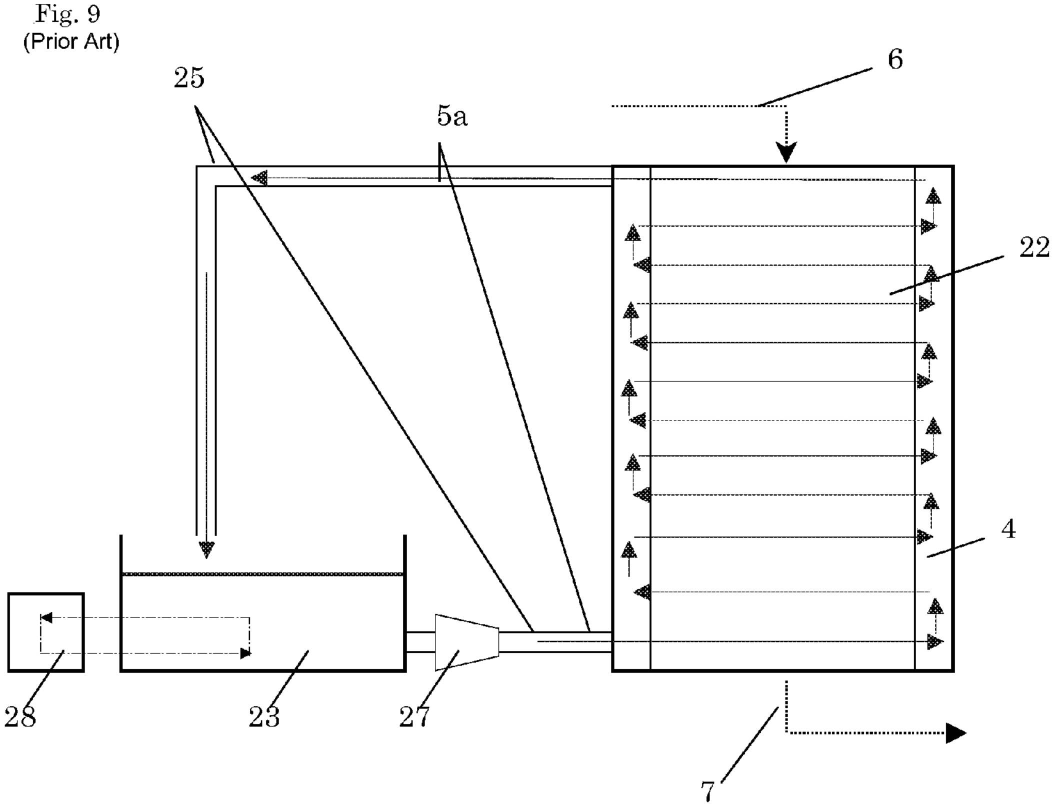
Fig. 9 (Prior Art)
FIG. 9 shows a layout view of a conventional plant having a temperature-controlled fluid storage tank.

Namely, the enclosed pressure-resistant jacket is constructed to have a multistage construction, wherein the first stage of the lowest stage has the structure of the enclosed pressure-resistant jacket in the plant with the above-mentioned small-sized fluid storage tank, each of the second and subsequent stages is constructed similarly to the first stage (refer to FIGS. 5 and 7), or alternatively, a suction pump may be omitted in the second and subsequent stages (refer to FIGS. 6 and 8). Also in this case, the height B' (m) of each enclosed pressure-resistant jacket 4*a*, 4*b*, 4*c*, etc. is set to be not more than a value of a maximum suction height ($C_{max}$) of the cooling or heating medium by a suction pump subtracted by a safe operational value S (m) (i.e. $B' \leq (C_{max} - S)/\rho$. When a server tank is provided in each stage, the height A' from the liquid level of each server tank to the bottom of the corresponding enclosed pressure-resistant jacket is preferably set to satisfy the following equation (5'):

$$A' \geq \{W(1-x+d)\}/\rho \quad (5')$$

(wherein W, x, d and ρ are as defined above).

In the embodiments having a three stage construction as shown in FIGS. 5 and 6, a cooling or heating medium-server tank 10*a*, 10*b* or 10*c* is provided in each stage, and each server tank is arranged so that the liquid level of each server tank is below the bottom of each enclosed pressure-resistant jacket 4*a*, 4*b*, 4*c*. A suction pump 1*a*, 1*b*, 1*c* is provided between the exit of each enclosed pressure-resistant jacket 4*a*, 4*b*, 4*c* and a cooling or heating medium-storage tank 3. A cooling or heating medium-receiver tank 11*b*, 11*c* may be provided between the suction pump 1*b*, 1*c* in the second or subsequent stages and the cooling or heating medium-storage tank 3 (FIG. 5). Alternatively, in each plant unit including the enclosed pressure-resistant jacket 4*b*, 4*c* of the second or subsequent stage, the height between the exit of each enclosed pressure-resistant jacket and the cooling or heating medium-storage tank exceeds the suction height of the cooling or heating medium by a suction pump, and thus a suction pump 1*b*, 1*c* may be omitted, and, instead thereof, a T-shaped piping 16 for supplying a priming water at the commencement of operation and a valve 15 may be provided in each of the conduit lines between each of the exit of the enclosed pressure-resistant jackets 4*b*, 4*c* in the second or subsequent stages and a cooling or heating medium-storage tank 3 (FIGS. 6 and 8).

In place of providing a cooling or heating medium-server tanks 10*a*, 10*b*, 10*c* or the like in each stage, a cooling or heating medium may be supplied directly from a cooling or heating medium-storage tank 3 to the bottom of each enclosed pressure-resistant jacket 4*a*, 4*b*, 4*c* by means of a pressure-reduction unit 12 provided in each stage as shown in FIGS. 7 and 8. In the embodiment shown in FIG. 7, a physically pressure-reducing apparatus 14*a*, 14*b* or 14*c*, and an electromagnetic valve 13 are provided in each stage, and a cooling or heating medium-receiver tank 11*b* or 11*c* is provided in the second and subsequent stages. In the embodiment shown in FIG. 8, a physically pressure-reducing apparatus 14 and an electromagnetic valve 13 are provided only in the first stage, and in the second and subsequent stages, suction pumps 1*b* and 1*c* are omitted but, in place of the suction pump, a T-shaped piping 16 for supplying a priming water at the commencement of operation and a valve 15 are provided in each of the conduit lines between each of the exit of enclosed pressure-resistant jackets 4*b*, 4*c* in the second or subsequent stage and a cooling or heating medium-storage tank 3.

Figure 11:
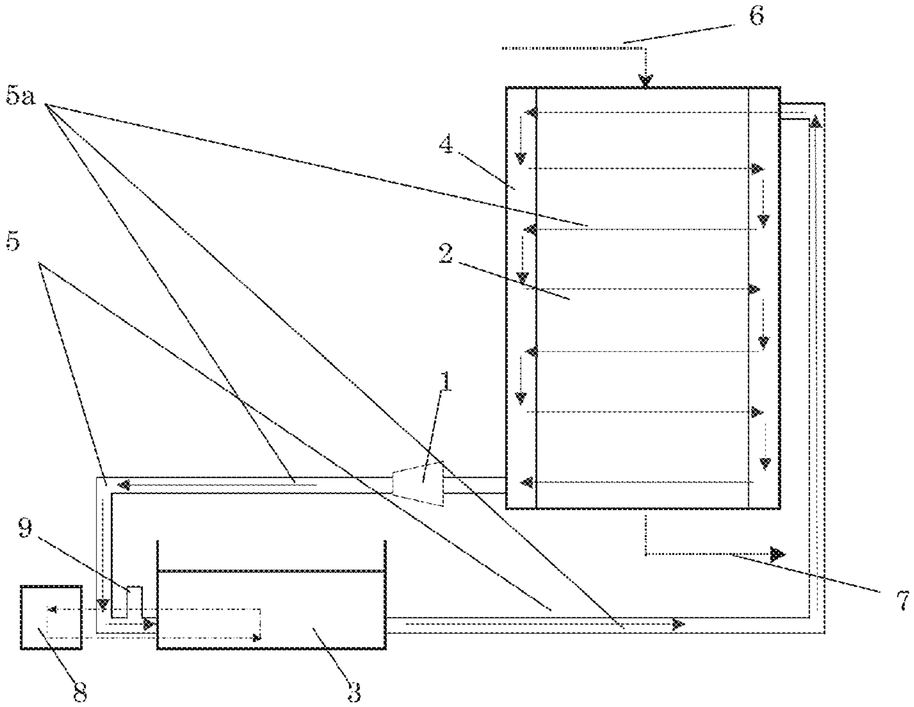
FIG. 11 shows a layout view of a one stage plant according to a fifth embodiment of the present invention.

The embodiment shown in FIG. 11 shows an embodiment in which a cooling or heating medium is sent to a position other than a bottom, for example, a top, of an enclosed pressure-resistant jacket 4, in place of sending the medium from a cooling or heating medium-storage tank 3 to the bottom of enclosed pressure-resistant jacket 4 via a cooling or heating medium-flow conduit line 5 as in the embodiment shown in FIG. 1.

The cooling or heating medium usable in the present invention is a medium which is usually liquid at atmospheric pressure, and includes both of a cooling medium and a heating medium. By the cooling medium is meat a liquid for cooling a fluid in a fluid storage tank, and examples thereof include a cooling water and antifreeze liquid (generally an ethylene glycol liquid or propylene glycol liquid) cooled by a refrigeration unit. The cooling medium in the cooling or heating medium-storage tank is cooled to approximately from −0 to 5° C., usually approximately from −2 to 2° C. by a cooling apparatus, as necessary.

By the heating medium is meat a liquid for heating a fluid in the fluid storage tank, and examples of the heating medium usable in the present invention include a hot water or hot oil heated by a heating apparatus.

In the present invention, the cooling medium and the heating medium mentioned above flows within the enclosed pressure-resistant jacket under conditions of temperature and pressure under which they are in a liquid state.

The fluid in the fluid storage tank is liquid under a temperature-controlled state, such as milk, wine, sake (alcoholic beverage), beverage, etc. or is powder. The storage tank is usually open to atmospheric pressure, but may be a pressurized closed system. In the case of a pressurized closed system, the enclosed pressure-resistant jacket is relatively reduced in pressure compared with that in the storage tank.

The suction pump usable in the present invention is desirably a self-suction pump, such as a self-suction centrifugal pump or piston pump. It is necessary that the pump efficacy of the self-suction pump ($C_{max}$) is not less than a height difference between a liquid level of the cooling or heating storage tank (or server tank) and an admission port of the self-suction pump, namely a height from the liquid level of the storage tank to a top of the enclosed pressure-resistant jacket (A+B).

Detection of Cracks in Fluid Storage Tank

It is desirable to provide an air pool 9 in a conduit pipe through which a cooling or heating medium returns from the suction pump 1 to the cooling or heating medium-storage tank 3. If air is pooled in the air pool, it is ready to detect something abnormal generated in the plant itself.

It is periodically carried out to sample a cooling or heating medium in the cooling or heating medium-storage tank 3 from the air pool 9 and analyze the components of the cooling or heating medium by using a component analyzer such as gas chromatography or liquid chromatography. If the fluid in fluid storage tank 2 is detected in the sample of cooling or heating medium, it is highly possible that some cracks have generated in the wall between the enclosed pressure-resistant jacket 4 and the fluid storage tank 2. Namely, according to the present invention, abnormality of the wall of the fluid storage tank can be readily detected.

It is desirable to provide this air pool 9 in the conduit pipe through which a cooling or heating medium returns from the suction pump 1 to the cooling or heating medium-storage tank 3, preferably at a position of the pipe near the cooling or heating medium-storage tank 3 and not higher than the liquid level of the storage tank 3.

Figure 4:
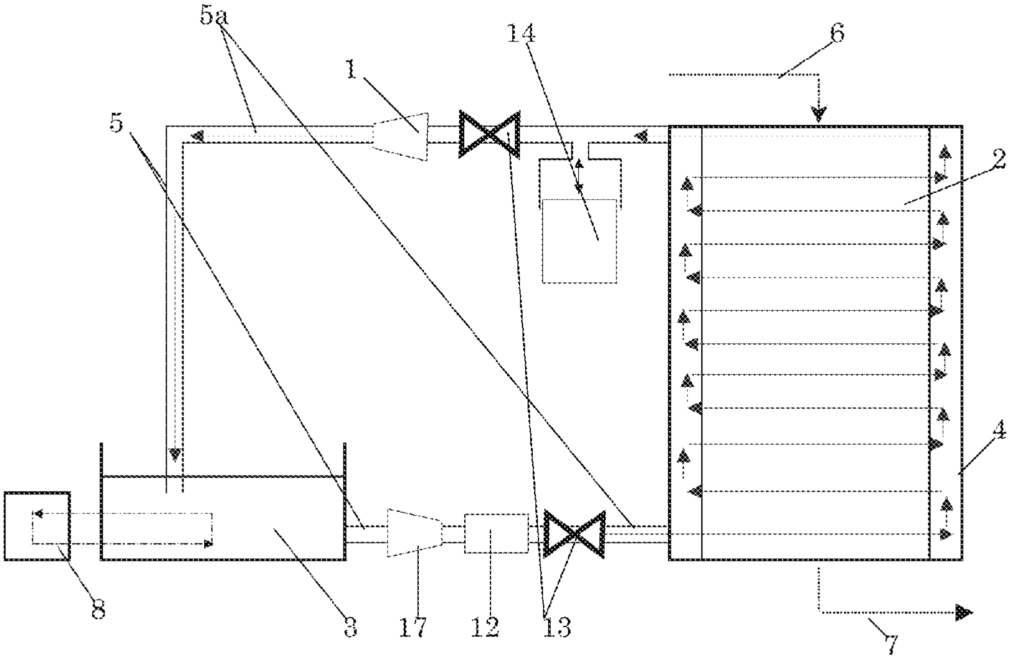
FIG. 4 shows a layout view of a one stage plant according to a fourth embodiment of the present invention.
Figure 10:
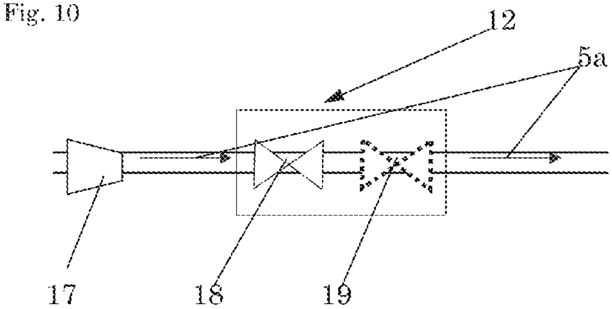
FIG. 10 shows a layout view of a pressure-reduction unit used for the plant according to the present invention.

Pressure-reduction unit 12 usable in the embodiments shown in FIGS. 4, 7 and 8 consists of a pressure-reduction valve 18 and a differential pressure valve 19, as shown in FIG. 10. Pressure-reduction unit 12 can reduce and maintain at a constant value the pressure of the cooling or heating medium pressurized by pressurizing pump 17 by means of the pressure-reduction valve 18, and can achieve a pressure-reduced state by the differential pressure valve 19. If the pressure of the cooling or heating medium which has passed through the pressure-reduction valve 18 is too low (for example, 2 atm or lower), pressure reduction by the differential pressure valve 19 may become difficult to act. Thus, the pressure of the cooling or heating medium passed trough the pressure-reduction valve 18 is set to be not less than 2 atm, preferably 2 to 4 atm. The set up pressure E (atm) in the pressure-reduction unit is E=x−d, wherein x and d are as defined above.

EXAMPLE

Example 1

In the one-stage plant shown in FIG. 1, the height of a fluid storage tank 2 with it's upper part open to the air is about 5 m, the height (A) from the liquid level of a cooling or heating medium(water)-storage tank 3 to the bottom of an enclosed pressure-resistant jacket 4 is 1 m, and the height (B) from the bottom of the enclosed pressure-resistant jacket 4 to the top thereof is 5 m. A self-suction centrifugal pump 1 (manufactured by Ebara Corporation, Type 40FQD5.15A with bore diameter of 40 mm, maximum suction height ($C_{max}$) of 7 m, and power output of 1.5 KW) is used therein and connected to a cooling or heating medium flow pipe 5 (polyvinyl chloride pipe of 40 A).

The cooling or heating medium-storage tank 3 is always controlled by automatically operating a temperature control apparatus 8 to cool or heat the cooling or heating medium at an arbitrary temperature by the temperature control apparatus 8 connected to the storage tank so that the medium can be used as an ice banker or hot banker.

In the fluid-storage tank 2, a fluid is introduced by a fluid input pipe 6 and sent to a fluid takeoff pipe 7. Before introducing the fluid to the fluid-storage tank 2 through the fluid input pipe 6, or immediately after introduction of the fluid, operation of the self-suction centrifugal pump 1 is started by introducing the cooling or heating medium thereto, and the cooling or heating medium is circulated by allowing it to flow from the cooling or heating medium-storage tank 3 through an enclosed pressure-resistant jacket 4 provided on the wall of the fluid-storage tank 2 in a cooling or heating medium flow direction 5*a* in the cooling or heating medium flow pipe 5, suctioning the medium by self-suction centrifugal pump 1, and returning the medium to the cooling or heating medium-storage tank 3. The circulation of the cooling or heating medium is appropriately carried out during the period of time when the fluid is stored in the fluid-storage tank 2, taking optional temperature control into consideration.

In the above plant, the cooling or heating medium (water) flowed in the enclosed pressure-resistant jacket 4 at a reduced pressure compared with that in the fluid-storage tank 2.

Each of the enclosed pressure-resistant jackets 4 in FIGS. 1-8 is connected at their bottom to the cooling or heating medium-storage tank 3, the cooling or heating medium server tanks 10*a*, 10*b* or 10*c*, the cooling or heating medium receiver tank 11*b* or 11*c*, or to the pressure reduction unit 12. However, the enclosed pressure-resistant jacket 4 may be connected to the cooling or heating medium-storage tank or the like at a position other than the bottom position.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

EXPLANATION OF SYMBOLS

1: self-suction centrifugal pump (suction pump)
2: fluid-storage tank
3: cooling or heating medium-storage tank
4, 4*a*, 4*b*, 4*c*: enclosed pressure-resistant jacket
5: cooling or heating medium flow pipe
5*a*: cooling or heating medium flow direction
6: fluid input pipe
7: fluid takeoff pipe
8: temperature control apparatus
9: air pool
10*a*, 10*b*, 10*c*: liquid level controlled cooling or heating medium server tank
11*b*, 11*c*: cooling or heating medium receiver tank
12: pressure-reduction unit
13: electromagnetic valve,
14: physically pressure-reducing apparatus
15: valve for supplying priming water at the commencement of operation
16: T-shaped piping
17: pressurizing pump
18: pressure-reduction valve
19: differential pressure valve

The invention claimed is:

1. A method for preventing contamination of a fluid in a fluid storage tank under a predetermined pressure with a liquid cooling or heating medium owing to breakage of a wall of the fluid storage tank in which the temperature thereof is controlled by allowing the cooling or heating medium to flow in an enclosed pressure-resistant jacket provided around an outer wall of the fluid storage tank, which comprises allowing the cooling or heating medium to flow in the enclosed pressure-resistant jacket at a pressure lower than a pressure x (atm) applied within the fluid storage tank, wherein a cooling or heating medium-storage tank or a cooling or heating medium-supplying server tank is provided separately from the fluid storage tank to supply said liquid cooling or heating medium, and said medium-storage tank or said medium-supplying server tank is set at a level lower than a bottom of the enclosed pressure-resistant jacket to maintain the pressure in the enclosed pressure-resistant jacket at a pressure lower than the pressure x (atm).

2. The method according to claim 1, wherein the cooling or heating medium is allowed to flow in the enclosed pressure-resistant jacket at a pressure lower than the pressure x (atm) applied to the fluid storage tank by setting a liquid level of the cooling or heating medium-storage tank opened to the air or in the cooling or heating medium-supplying server tank opened to the air at a level lower than the bottom of the enclosed pressure-resistant jacket by a height A (m), suctioning the cooling or heating medium by means of a suction pump connected to an exit of the cooling or heating medium in the enclosed pressure-resistant jacket, transferring the cooling or heating medium from the cooling or heating medium-storage tank to the enclosed pressure-resistant jacket via a conduit line, allowing the cooling or heating medium to flow and circulate through the enclosed pressure-resistant jacket, and returning the cooling or heating medium to the cooling or heating medium-storage tank via the suction pump, whereby allowing the cooling or heating medium to flow through the enclosed pressure-resistant jacket, wherein the height A (m) from the liquid level of the cooling or heating medium storage tank or the server tank to the bottom of the enclosed pressure-resistant jacket is set to satisfy the following equation:

$$A \geq \{W(1-x+d)\}/\rho$$

wherein,

W is a water-suction height (m) under vacuum;

x (atm) is a pressure (atm) applied to the inside of the fluid storage tank;

d (atm) is a difference in pressure (atm) between the pressure x (atm) within the fluid storage tank and a pressure (atm) at the bottom of the enclosed pressure-resistant jacket, wherein d>0:

ρ is a specific density of the cooling or heating medium, wherein, the relation among the height A (m), a height B (m) of the enclosed pressure-resistant jacket from the bottom to the top thereof, and a suction height C (m) of the cooling or heating medium by means of the suction pump satisfies the following equation:

$$B \leq C-A$$

wherein, $$C=(C_{max}-S)/\rho;$$

$C_{max}$ (m) is a maximum suction height (m) of the cooling or heating medium by the suction pump, provided that the $C_{max}$ is a suction height when the cooling or heating medium is deemed as water;

S (m) is a safe operational value (m) and is larger than 0 (S>0); and

ρ and A are as defined above.

3. The method according to claim 1, wherein a space in which the cooling or heating medium flows is physically and forcibly reduced in pressure while stopping the flow of the cooling or heating medium and sealing the space.

4. The method according to claim 1, wherein the cooling or heating medium is supplied from the cooling or heating medium-storage tank opened to the air or from the cooling or heating medium-supplying server tank opened to the air.

5. A plant in which contamination of a fluid in a fluid storage tank under a predetermined pressure with a liquid cooling or heating medium owing to breakage of a wall of the fluid storage tank is prevented, wherein the temperature of the fluid in said fluid storage tank is controlled by allowing the cooling or heating medium to flow through an enclosed pressure-resistant jacket provided around an outer wall of the fluid storage tank, wherein the cooling or heating medium supplied from a cooling or heating medium-storage tank opened to the air or from a cooling or heating medium-supplying server tank opened to the air flows in the enclosed pressure-resistant jacket at a pressure lower than a predetermined pressure x (atm) within the fluid storage tank, and wherein said cooling or heating medium-storage tank or said cooling or heating medium-supplying server tank is provided separately from the fluid storage tank and is set at a level lower than a bottom of the enclosed pressure-resistant jacket to maintain the pressure in the enclosed pressure-resistant jacket at a pressure lower than the predetermined pressure x (atm).

6. The plant according to claim 5, which comprises: (a) the enclosed pressure-resistant jacket for allowing the cooling or heating medium to flow and circulate therein, said jacket being provided around the outer wall of the fluid storage tank; (b) the cooling or heating medium-storage tank or the cooling or heating medium-supplying server tank having a vent and being connected at one end to the enclosed pressure-resistant jacket via a conduit line wherein a liquid level of said cooling or heating medium-storage tank or cooling or heating medium-supplying server tank is set at a level lower than the bottom of the fluid storage tank by a height A (m) (A>0); and (c) a suction pump connected at one end to an exit of the cooling or heating medium in the enclosed pressure-resistant jacket and connected at another end to the cooling or heating medium-storage tank or said server tank;

wherein, the height A (m) from the liquid level of the fluid storage tank or said server tank to the bottom of the enclosed pressure-resistant jacket is set to satisfy the following equation:

$$A \geq \{W(1-x+d)\}/\rho$$

wherein,

W is a water-suction height (m) under vacuum;

x (atm) is a pressure (atm) applied to the inside of the fluid storage tank;

d (atm) is a difference in pressure (atm) in which a pressure (atm) at the bottom of the enclosed pressure-resistant jacket is subtracted from the pressure x (atm) within the fluid storage tank, wherein d>0;

ρ is a specific density of the cooling or heating medium, wherein, the relation among the height A (m), a height B (m) of the enclosed pressure-resistant jacket from the bottom to the top thereof, and a suction height C (m) of the cooling or heating medium by means of the suction pump satisfies the following equation:

$$B \leq C-A$$

wherein, $C=(C_{max}-S)/\rho$;

$C_{max}$ (m) is a maximum suction height (m) of the cooling or heating medium by the suction pump, provided that the $C_{max}$ is a suction height when the cooling or heating medium is deemed as water;

S (m) is a safe operational value (m) and is larger than 0 (S>0); and p and A are as defined above, whereby the cooling or heating medium is allowed to flow in the enclosed pressure-resistant jacket at a pressure lower than the pressure x (atm).

7. The plant according to claim 6, wherein the pressure difference d (atm) is in a range from 0.2 to 0.4 (atm).

8. The plant according to claim 5, wherein an air pool for sampling the cooling or heating medium is provided in a passage of the cooling or heating medium to analyze the components of the cooling or heating medium.

9. The plant according to claim 5, which further comprises a physically pressure-reducing apparatus for physically and forcibly reducing the pressure in a space in which the cooling or heating medium flows, while stopping the flow of the cooling or heating medium and sealing the space.

10. A plant in which contamination of a fluid in a fluid storage tank under a predetermined pressure with a liquid cooling or heating medium owing to breakage of a wall of the fluid storage tank is prevented, wherein the temperature of the fluid in said fluid storage tank is controlled by allowing the cooling or heating medium to flow through an enclosed pressure-resistant jacket provided around an outer wall of the fluid storage tank, wherein the cooling or heating medium supplied from a cooling or heating medium-storage tank opened to the air or from a cooling or heating medium-supplying server tank opened to the air flows in the enclosed pressure-resistant jacket at a pressure lower than a predetermined pressure x (atm) within the fluid storage tank, wherein the fluid storage tank is a larger size tank having a height B (m) exceeding a suction height C (m) of the cooling or heating medium by a suction pump, the enclosed pressure-resistant jacket has a multistage construction with not less than two staged enclosed pressure-resistant jackets, each of the second and subsequent stages being provided with (i) an enclosed pressure-resistant jacket and (ii) a cooling or heating medium-supplying server tank provided separately from the fluid storage tank, set at a level lower than a bottom of the enclosed pressure-resistant jacket, and arranged between the cooling or heating medium-storage tank and the bottom of each enclosed pressure-resistant jacket, wherein a height A' from a liquid level of each of the server tank to the bottom of each enclosed pressure-resistant jacket is set to satisfy the following equation: $A' \geq \{W(1-x+d)\}/\rho$ (wherein W is a water-suction height (m) under vacuum; x (atm) is a pressure (atm) applied to the inside of the fluid storage tank; d (atm) is a difference in pressure (atm) in which a pressure (atm) at the bottom of the enclosed pressure-resistant jacket is subtracted from the pressure x (atm) within the fluid storage tank, wherein d>0; p is a specific density of the cooling or heating medium), and a height A'+B' (m) from the liquid level of each server tank to the top of each enclosed pressure-resistant jacket is set to satisfy the following equation: $A'+B' \leq C$ (wherein $C=(Cmax-S)/p$, Cmax (m) is a maximum suction height (m) of water by the suction pump, provided that the Cmax is a suction height when the cooling or heating medium is water; S (m) is a safe operational value (m) and is larger than 0 (S>0); p is as defined above; A is as defined above, and B' is a height (m) from the bottom of each enclosed pressure-resistant jacket to the top thereof), whereby the cooling or heating medium is allowed to flow in the whole of the enclosed pressure-resistant jackets at a pressure lower than the predetermined pressure x (atm) within the fluid storage tank and a pressure in each of the enclosed pressure-resistant jackets is maintained at a pressure lower than the predetermined pressure x (atm) within the fluid storage tank.

11. A method for detecting cracks of a fluid storage tank in which the temperature of a fluid in said fluid storage tank is controlled by allowing a liquid cooling or heating medium supplied from a cooling or heating medium-storage tank or a cooling or heating medium-supplying server tank provided separately from the fluid storage tank to flow in an enclosed pressure-resistant jacket provided around an outer wall of the fluid storage tank under a predetermined pressure, which comprises allowing the liquid cooling or heating medium to flow in the enclosed pressure-resistant jacket at a pressure lower than a pressure x (atm) applied within the fluid storage tank by setting the cooling or heating medium-storage tank or the cooling or heating medium-supplying server tank at a level lower than a bottom of the enclosed pressure-resistant jacket to maintain a pressure in the enclosed pressure-resistant jacket lower than the pressure x (atm), sampling the cooling or heating medium from an air pool provided in a passage of the cooling or heating medium, and analyzing the components of the cooling or heating medium, while preventing contamination of the fluid in the fluid storage tank with the liquid cooling or heating medium.

12. The method for detecting cracks according to claim 11, wherein the cooling or heating medium-storage tank or the cooling or heating medium-supplying server tank is opened to the air.

* * * * *